United States Patent
Grisot-Saule et al.

(10) Patent No.: US 12,296,522 B2
(45) Date of Patent: May 13, 2025

(54) PRODUCTION OF AN ADHESIVE COMPOSITION IN AN EXTRUDER

(71) Applicant: BOSTIK SA, La Plaine Saint Denis (FR)

(72) Inventors: Myriam Grisot-Saule, Compiegne (FR); Sebastien Quinebeche, Bernay (FR)

(73) Assignee: BOSTIK SA, La Plaine Saint Denis (FR)

( * ) Notice: Subject to any disclaimer, the term of this patent is extended or adjusted under 35 U.S.C. 154(b) by 624 days.

(21) Appl. No.: 16/628,368

(22) PCT Filed: Jul. 2, 2018

(86) PCT No.: PCT/FR2018/051633
§ 371 (c)(1),
(2) Date: Jan. 3, 2020

(87) PCT Pub. No.: WO2019/008258
PCT Pub. Date: Jan. 10, 2019

(65) Prior Publication Data
US 2020/0180202 A1    Jun. 11, 2020

(30) Foreign Application Priority Data
Jul. 4, 2017    (FR) ..................... 1756297

(51) Int. Cl.
*B29C 48/40*        (2019.01)
*B29B 7/60*         (2006.01)
(Continued)

(52) U.S. Cl.
CPC .............. *B29C 48/402* (2019.02); *B29B 7/60* (2013.01); *B29C 48/405* (2019.02);
(Continued)

(58) Field of Classification Search
None
See application file for complete search history.

(56) References Cited

U.S. PATENT DOCUMENTS 4,092,089 A * 5/1978 Bocker ................. B29C 48/395
                                                         425/10
5,462,981 A * 10/1995 Bastioli ...................... C08J 3/18
                                                         524/53
(Continued)

FOREIGN PATENT DOCUMENTS

DE    20320505 U1 * 10/2004 ............... B29B 7/48
EP    1724321 B1    7/2009
(Continued)

OTHER PUBLICATIONS

Search report in PCT/FR2018/051633 dated Sep. 10, 2018 (pp. 1-5).
(Continued)

*Primary Examiner* — Jacob T Minskey
*Assistant Examiner* — Caroline Beha
(74) *Attorney, Agent, or Firm* — Csaba Henter; MILLEN, WHITE, ZELANO & BRANIGAN

(57) ABSTRACT

The invention concerns a method for preparing an adhesive composition using an extruder having at least two rotating screws, successively comprising:
  feeding a plasticizer into the extruder;
  degassing the plasticizer in the extruder;
  feeding a silylated prepolymer and mixing the latter with the plasticizer in the extruder; and
  discharging the mixture from the extruder.

20 Claims, 1 Drawing Sheet

(51) Int. Cl.
  *B29C 48/405* (2019.01)
  *B29C 48/505* (2019.01)
  *B29K 75/00* (2006.01)
  *C09J 175/04* (2006.01)
  *B29K 501/00* (2006.01)

(52) U.S. Cl.
  CPC ........... *B29C 48/505* (2019.02); *C09J 175/04* (2013.01); *B29K 2075/00* (2013.01); *B29K 2501/00* (2013.01)

(56) References Cited

U.S. PATENT DOCUMENTS

| | | | |
|---|---|---|---|
| 6,231,970 B1* | 5/2001 | Andersen | C08L 3/02 |
| | | | 106/206.1 |
| 6,407,195 B2 | 6/2002 | Sherman et al. | |
| 7,781,513 B2 | 8/2010 | Lucas et al. | |
| 8,138,297 B2* | 3/2012 | Huang | C09J 175/04 |
| | | | 528/30 |
| 8,535,798 B2 | 9/2013 | Poivet et al. | |
| 2010/0006221 A1* | 1/2010 | Janke | C08G 18/4202 |
| | | | 524/590 |
| 2011/0052912 A1* | 3/2011 | Poivet | C08G 18/10 |
| | | | 524/266 |
| 2014/0027056 A1 | 1/2014 | Suen | |
| 2016/0024440 A1* | 1/2016 | Simonsen | C11D 3/38609 |
| | | | 510/226 |
| 2018/0112043 A1* | 4/2018 | Janssen | C08J 3/2053 |

FOREIGN PATENT DOCUMENTS

| | | | |
|---|---|---|---|
| EP | 2393861 B1 | 10/2013 | |
| EP | 2886575 B1 * | 9/2016 | C08G 18/08 |
| JP | 2011503323 A | 1/2011 | |
| JP | 2011506737 A | 3/2011 | |
| JP | 2012517505 A | 8/2012 | |
| WO | 9634028 A1 | 10/1996 | |
| WO | 0037534 A1 | 6/2000 | |

OTHER PUBLICATIONS

Search report in corresponding JP Patent Application No. 2019-572124 dated Jun. 14, 2022 (pp. 1-3) and english translation thereof (pp. 1-3).

* cited by examiner

PRODUCTION OF AN ADHESIVE COMPOSITION IN AN EXTRUDER

FIELD OF THE INVENTION

The present invention concerns a method for preparing an adhesive composition containing silylated prepolymers and plasticizers particularly tackifying resins.

TECHNICAL BACKGROUND

«Pressure Sensitive Adhesives» (PSA) are substances imparting immediate tack at ambient temperature to backing supports coated therewith, allowing instant adhesion to a substrate under the effect of light pressure applied for a short time. PSAs are widely used for the production of self-adhesive labels attached to items for the conveying of information (e.g. bar code, name, price) and/or for decorative purposes. PSAs are also used for the production of self-adhesive tapes having varied uses. Mention can be made for example of transparent tape largely used in everyday life: the forming and assembly of cardboard packaging, the protection of surfaces for paintwork in the building industry, the supporting of electrical cables in the transport industry and the laying of carpets via double-sided adhesive tapes.

There is one field of PSA application for which it is desirable that the adhesive property of labels and/or tape onto a substrate should also be maintained when the adhesive seal ensuring attachment (and therefore also the item carrying the label and/or tape) is exposed to a temperature likely to vary over a wide range. For example, the applying of labels to some automotive or vehicle parts can be cited positioned close to the engine, or on packaging designed to receive a hot liquid at the time of packaging, or on items (such as tyres) that are hot-labelled on leaving the production line. Mention can also be made of self-adhesive tape for the assembly of parts for which good heat resistance is required as is the case for example for inner furnishings of aircraft or other vehicles.

The PSAs used for these fields of application often comprise acrylate-type polymers of very high molecular weight, either in the form of aqueous emulsions or in solvent form. However, this type of composition carries some restrictions: a drying step must be provided with evaporation of water or solvent, these compositions raise problems of hygiene and safety on account of the presence of organic solvent, and the production of labels and/or tape having a gram weight higher than 70 g/m$^2$ is highly complicated with this type of composition, the gram weight being the amount of PSA continuously applied onto a backing support in particular for the production of labels and/or adhesive tape.

Another method is to use compounds of crosslinkable, hot melt type such as described in document WO 2012/090151.

Documents EP 2235133 and EP 2336208 describe such crosslinkable, hot melt compositions having a PSA characteristic that affords temperature-stable adhesive properties after thermal and moisture crosslinking. These PSAs are obtained by mixing a prepolymer of polyether or polyether-polyurethane type, having 2 terminal groups of hydrolysable alkoxysilane type, with a compatible tackifying resin and a crosslinking catalyst. These adhesive compositions are prepared following a batch method comprising a first step at between 50 and 170° C., protected against air and preferably in an inert atmosphere, to mix the prepolymer having alkoxysilane terminal groups with the tackifying resin, a second step to cool the mixture to a temperature of between 50 and 90° C., and a third step to incorporate the catalyst at between 50 and 90° C. in the previously obtained mixture.

Said preparation method has several drawbacks, however. Indeed, having regard to the presence of water (typically between 3000 and 5000 ppm) in the tackifying resins used in these thermally-crosslinkable PSA compositions, it is highly probable to ascertain early, undesired and uncontrolled crosslinking of the molecular chains that is either discrete, local and non-homogeneous or else in the entire bulk of the product. This crosslinking occurs at the time of mixing or else during storage of the composition in containers over time, the composition potentially being subjected to high ambient temperatures before use for the production of crosslinked PSA coatings. It is undesirable since it generates physical changes such as the presence of highly crosslinked non-homogeneous small particles or an increase in the viscosity of the adhesive before use requiring adjustments to coating machines. To avoid these problems, it is often necessary, at the start of batch mixing operations, to carry out prior dehydration thereof via vacuum heat treatment to between 130 and 180° C. for several hours. In addition, despite the possible addition of a combination of antioxidants at this step, the high temperatures to which the tackifying resins are subjected generate degradation of the resins, translating as an increased quantity of volatile organic compounds (VOCs) in the end PSA composition. The application of these high temperatures can also lead to degradation of the block polyethers of the silylated polymers. Also, the vacuum dehydration step does not allow proper removal of the water naturally contained in the resins which may still contain 500 to 600 ppm of residual water after being held in a vacuum at 160° C. for one hour. The presence of water is detrimental to the storage stability of the PSA composition thus prepared, and the presence of VOCs is detrimental to the quality of the targeted final applications (adhesive tape and/or labels). Another disadvantage intrinsic to the production of a thermally-crosslinkable adhesive composition using the batch method, is the need to determine the best compromise between the catalyst addition temperature and the viscosity of the medium. Ideally, to prevent triggering of the crosslinking reaction, the catalyst should be added at a low temperature i.e. a temperature lower than 70° C., but under these conditions the high viscosity of the medium makes it extremely difficult and even impossible to obtain dispersion and good homogenization of the catalyst in the medium. This therefore requires operating at temperatures at which the activity of the catalyst is nonzero, and the choice and quantity of catalyst are very limited having regard to these restrictions. In addition, the mixing time in an inert atmosphere, followed by emptying of the mixing vessels is time-consuming and may take several hours, potentially to the detriment of the heat stability of the materials in particular regarding uncontrolled pre-crosslinking.

Document CN 102827568 describes a continuous method using a twin-screw extruder to prepare a moisture-crosslinkable sealant composition containing a silylated polymer, a plasticizer, a stabilizing agent, a thixotropic agent and an inorganic filler (calcium carbonate).

Document CN 103331891 discloses a method using a twin-screw extruder to prepare a non-reactive HMPSA composition (Hot Melt Pressure Sensitive Adhesive) comprising a block styrene copolymer of styrene-isoprene-styrene (SIS) type, a plasticizing oil, a tackifying resin and an antioxidant.

Document U.S. Pat. No. 8,431,675 describes a method for preparing a silylated polyurethane and adhesive compositions comprising this polymer.

Document WO 2007/037824 describes a continuous method in a reactor for preparing silylated polyurethane polymers able to be used to produce sealants, adhesives and coatings.

However, none of the above-cited documents describes a method for preparing an adhesive composition containing a silylated polymer and tackifying resin allowing efficient dehydration of the tackifying resin.

There is therefore a true need for a method to prepare PSA compositions containing a silylated prepolymer and a plasticizer (e.g. a tackifying resin) allowing faster preparation with a shorter residence time and at lower temperature, allowing more efficient dehydration of the plasticizer(s).

SUMMARY OF THE INVENTION

The invention concerns a method for preparing an adhesive composition using an extruder having at least two rotary screws, successively comprising:
- feeding at least one plasticizer into the extruder;
- degassing the plasticizer in the extruder;
- feeding at least one silylated prepolymer and mixing the latter with the plasticizer in the extruder; and
- discharging the mixture from the extruder.

In one embodiment, the extruder is a co-rotating, intermeshing twin-screw extruder.

In one embodiment, the geometry of the extruder is defined by the ratio of the outer diameter of the screws to the inner diameter of the screws, De/Di being 1.3 to 1.8, preferably 1.55 to 1.8.

In one embodiment, the length of the extruder is defined by a multiple of the diameter D of the screws, being 28D to 100D, preferably 40D to 80D.

In one embodiment, the silylated prepolymer has a main chain selected from among a polyether main chain, polyether-polyurethane main chain, polyester main chain, polyester-polyurethane main chain, polyether-polyester-polyurethane main chain, polyolefin main chain, polyolefin-polyurethane main chain, polyether-polyolefin-polyurethane main chain, polyacrylate main chain and polyether-polyacrylate main chain, and comprises two hydrolysable alkoxysilane terminal groups, and preferably the silylated prepolymer is a prepolymer of polyether or polyether-polyurethane type comprising two hydrolysable alkoxysilane terminal groups.

In one embodiment, the silylated prepolymer is a prepolymer having formula (I):

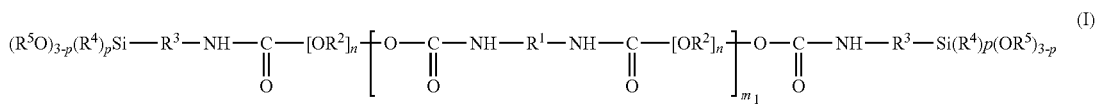

wherein:
- $R^1$ is a divalent hydrocarbon radical having 5 to 15 carbon atoms and can be aromatic or aliphatic, linear, branched or cyclic;
- $R^2$ is a linear or branched divalent alkylene radical having 1 to 4 carbon atoms;
- $R^3$ is a linear divalent alkylene radical having 1 to 3 carbon atoms;
- $R^4$ and $R^5$, the same or different, are each a linear or branched alkyl radical having 1 to 20 carbon atoms, preferably 1 to 4, with the possibility when there are several $R^4$ or $R^5$ radicals that they can be the same or different;
- n is an integer such that the number average molecular weight of the block polyether of formula —$[OR^2]_n$— is between 300 Da and 30 kDa;
- $m_1$ is a zero or nonzero integer;
- n and $m_1$ are such that the number average molecular weight of the polymer of formula (I) is between 600 Da and 60 kDa;
- p is an integer equal to 0, 1 or 2;

and preferably having viscosity measured at 23° C. ranging from 25 to 100 Pa·s.

In a second embodiment, the silylated prepolymer is a polyether having formula (VI):

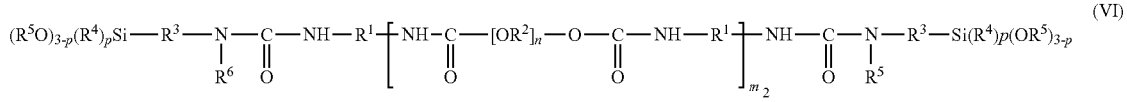

wherein:
- $R^1$ is a divalent hydrocarbon radical having 5 to 15 carbon atoms and can be aromatic or aliphatic, linear, branched or cyclic;
- $R^2$ is a linear or branched, divalent alkylene radical having 1 to 4 carbon atoms;
- $R^3$ is a linear divalent alkylene radical having 1 to 3 carbon atoms;
- $R^4$ and $R^5$, the same or different, are each a linear or branched alkyl radical of 1 to 4 carbon atoms, with the possibility when there are several $R^4$ or $R^5$ radicals that they can be the same or different;

$R^6$ is a hydrogen atom, a phenyl radical, 2-succinate radical or linear, branched or cyclic alkyl radical having 1 to 6 carbon atoms;

n is an integer such that the number average molecular weight of the block polyether of formula $-[OR^2]_n-$ is between 300 Da and 30 kDa;

$m_2$ is a nonzero integer;

n and $m_2$ are such that the number average molecular weight of the polymer of formula (I) is between 600 Da and 60 kDa;

p is an integer equal to 0, 1 or 2;

and preferably having viscosity measured at 23° C. ranging from 25 to 100 Pa·s.

In one embodiment, the plasticizer is or comprises a tackifying resin.

In one embodiment, the tackifying resin has a number average molecular weight of between 200 Da and 10 kDa and is preferably selected from among:

(i) resins obtained by polymerization of terpene hydrocarbons and phenols, in the presence of Friedel-Crafts catalysts;

(ii) resins obtained with a method comprising the polymerization of alpha-methyl styrene;

(iii) rosins of natural or modified origin, and the derivatives thereof hydrogenated, dimerized, polymerized or esterified by monoalcohols or polyols;

(iv) resins obtained by hydrogenation, polymerization or copolymerization of mixtures of unsaturated aliphatic hydrocarbons having about 5, 9 or 10 carbon atoms derived from petroleum fractions;

(v) terpene resins;

(vi) copolymers containing natural terpenes; and (vii) acrylic resins having viscosity at 100° C. lower than 100 Pa·s.

In one embodiment, the amount by weight of silylated prepolymer is 20 to 85%, preferably 30 to 75%, and the amount by weight of plasticizer is 15% to 80%, preferably 25% to 70%, relative to the weight of the adhesive composition.

In one embodiment, the adhesive composition is free of crosslinking catalyst.

In one embodiment, the adhesive composition comprises a crosslinking catalyst, the method comprising the addition of the catalyst and mixing thereof with the plasticizer and silylated prepolymer, this addition preferably being made in the extruder, more preferably between the feeding of the silylated prepolymer and discharge.

In one embodiment, the amount by weight of crosslinking catalyst is 0.01% to 8%, preferably 0.1% to 2%, relative to the weight of the adhesive composition.

In one embodiment, the residence time of the plasticizer in the extruder is 0.1 to 3 minutes, preferably 0.5 to 2.5 min, more preferably 1 to 2 min.

In one embodiment, the plasticizer after being degassed contains an amount of water by weight less than or equal to 500 ppm, preferably less than or equal to 300 ppm, more preferably less than or equal to 200 ppm, further preferably less than or equal to 100 ppm; and/or the plasticizer before degassing contains an amount of water by weight higher than or equal to 500 ppm, preferably higher than or equal to 1000 ppm, more preferably higher than or equal to 2000 ppm.

In one embodiment, the method also comprises one or more steps to add to the extruder one or more compounds selected from among antioxidants, moisture scavengers, thermoplastic polymers, plasticizers, paraffinic and naphthenic oils, waxes of a polyethylene homopolymer, waxes of a polyethylene and vinyl acetate copolymer, pigments, colouring agents and fillers.

In one embodiment, the temperature of the extruder when degassing the plasticizer is 5° C. to 100° C. above the ring-and-ball softening point of the plasticizer measured according to standard ISO 4625.

In one embodiment, the method also comprises one or more additional degassing operations, and preferably comprises at least one additional degassing after mixing the silylated prepolymer with the plasticizer.

In one embodiment, the temperature of the extruder from the feed point of the plasticizer as far as the discharge point, increases from ambient temperature up to a maximum temperature Tmax when degassing the plasticizer, Tmax preferably being between 150° C. and 220° C., more preferably between 160° C. and 180° C., further preferably between 165° C. and 175° C., and Tmax still further preferably being about 170° C.; it is then decreased down to a final temperature Tf for discharge of between ambient temperature and Tmax, Tf preferably being between 20° C. and 145° C., more preferably between 120° C. and 140° C., and Tf further preferably being about 130° C.

In one embodiment, the temperature Tm of the extruder when mixing the prepolymer with the plasticizer is between Tf and Tmax, Tm preferably being between 130° C. and 170° C., more preferably between 140° C. and 160° C., further preferably between 145° C. and 155° C., Tm still further preferably being about 150° C.

With the present invention, it is possible to overcome the disadvantages of the prior art. More particularly, it provides a method for preparing an adhesive composition containing silylated prepolymer(s) and plasticizer(s), preferably tackifying resins, which is implemented at relatively low temperatures and for a short time, thereby reducing risks of degradation of the plasticizer(s) and/or of the silylated prepolymer(s). The amount of water added to the composition is very small, thereby strongly limiting risks of early crosslinking.

This is achieved through the use of an extruder with a particular sequence of steps.

DESCRIPTION OF EMBODIMENTS OF THE INVENTION

Figure 1:
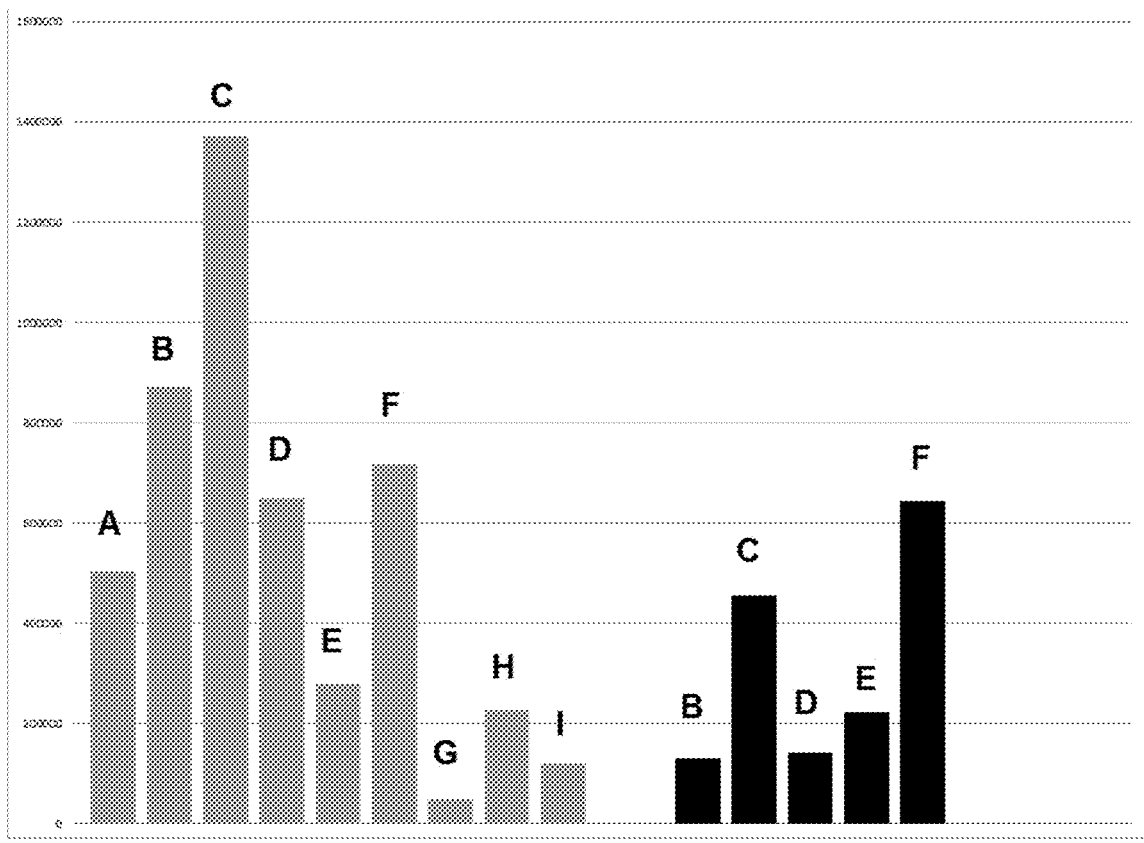
FIG. 1 illustrates the VOC content of an untreated tackifying resin (grey bars) and of a resin previously mixed in a twin-screw extruder (black bars), measured by gas phase chromatography coupled with mass spectrometry. The Y-axis represents the surface area/mass ratio of the sample.

The invention is now described in more detail in the following nonlimiting description.

In the present description and unless otherwise expressed all indicated percentages (%) are weight percentages.

The number and weight average molecular weights are expressed in Dalton (Da) and can be determined by size exclusion chromatography using a Waters Alliance 2695 system equipped with Empower 2 (Waters) data acquisition and processing software. The solvent used was tetrahydrofuran stabilized with 0.025% butylated hydroxytoluene (Fisher), with a flow rate of 1 mL/min, column temperature of 35° C. and injection volume of 50 μL. The separation columns were composed of a guard column of size 50×7.8 mm×5 μm, one $10^3$ A column (300×7.8 mm; 1K-75K Mw; Phenomenex 00H-044-KO), two $10^4$ A columns (300×7.8 mm; 5K-500K Mw; Phenomenex 00H-045-KO), and one $10^5$ A column (300×7.8 mm; 10K-1000K Mw; Phenomenex OOH-046-KO), the columns being calibrated with polystyrene standards PS). Detection was carried out with a Waters 410 refractometer and Waters 2996 detector, at a temperature of 35° C.

The indicated viscosities were measured with a Brookfield viscosimeter, with No 7 spindle rotating at a speed adapted to the sensitivity of the sensor (on average 20 rpm).

The invention concerns a method for preparing an adhesive composition containing at least one plasticizer and at least one silylated prepolymer using an extruder. This method allows continuous preparation of the adhesive composition.

Preferably the adhesive composition is a Pressure Sensitive Adhesive (PSA).

In the present application, «a prepolymer» is to be construed as meaning «one or more prepolymers» and «a plasticizer» or «a tackifying resin» is to be construed as meaning «one or more plasticizers», respectively «one or more tackifying resins». The same applies to the other compounds of the adhesive composition.

The method of the present invention successively comprises:
feeding a plasticizer into the extruder;
degassing the plasticizer in the extruder;
feeding a silylated prepolymer and mixing the latter with the plasticizer in the extruder;
discharging the mixture from the extruder.

By «the method successively comprises» it is meant that the above-mentioned steps, separate from each other, are implemented one after the other for a given portion of plasticizer (on the understanding that when the method is a continuous method, all the above steps are simultaneously conducted from an equipment viewpoint but in separate portions of this equipment). The silylated prepolymer is therefore fed at a position located downstream in the extruder relative to the position at which the plasticizer is fed and relative to the degassing position of the plasticizer in the extruder. In the present application, the terms «downstream» and «upstream» are defined in relation to the direction of circulation of the products in the extruder.

Silylated Prepolymers

In one particular embodiment, the silylated prepolymer comprises at least one hydrolysable alkoxysilane group (preferably terminal), and preferably the silylated prepolymer comprises at least two hydrolysable alkoxysilane groups (preferably terminal).

In one particular embodiment, the silylated prepolymer has a main chain selected from among a polyether main chain, polyether-polyurethane main chain, polyester main chain, polyester-polyurethane main chain, polyether-polyester-polyurethane main chain, polyolefin main chain, polyolefin-polyurethane main chain, polyether-polyolefin-polyurethane main chain, polyacrylate main chain and polyether-polyacrylate main chain.

In one particular embodiment, the hydrolysable alkoxysilane groups have the formula $—Si(R^4)_p(OR^5)_{3-p}$ where $R^4$ and $R^5$, the same or different, are each a linear or branched alkyl radical having 1 to 4 carbon atoms, with the possibility when there are several $R^4$ or $R^5$ radicals that they can be the same or different.

In a first embodiment, the silylated prepolymer is of polyether or polyether-polyurethane type.

Advantageously, the silylated prepolymer is a prepolymer of formula (I):

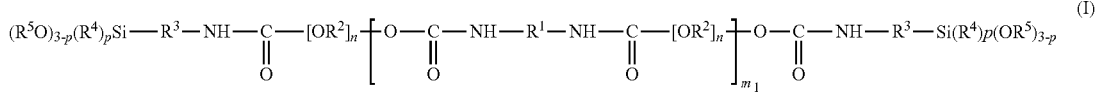

where:
$R^1$ is a divalent hydrocarbon radical having 5 to 15 carbon atoms and can be aromatic or aliphatic, linear, branched or cyclic;
$R^2$ is a linear or branched divalent alkylene radical having 1 to 4 carbon atoms;
$R^3$ is a linear divalent alkylene radical having 1 to 3 carbon atoms;
$R^4$ and $R^5$, the same or different, are each a linear or branched alkyl radical having 1 to 20 carbon atoms, preferably 1 to 4, with the possibility when there are several $R^4$ or $R^5$ radicals that they can be the same or different;
n is an integer such that the number average molecular weight of the block polyether of formula $—[OR^2]_n—$ is between 300 Da and 30 kDa;
$m_1$ is a zero integer (the case for the polyether prepolymer) or nonzero (the case for the polyether-polyurethane prepolymer);
n and $m_1$ are such that the number average molecular weight of the polymer of formula (I) is between 600 Da and 60 kDa;
p is an integer equal to 0, 1 or 2.

If $m_1$ is nonzero, the prepolymer of formula (I) can be obtained with the following method.

At a first step, a polyether-polyurethane polyol is synthesized comprising two hydroxyl terminal groups and having formula (II):

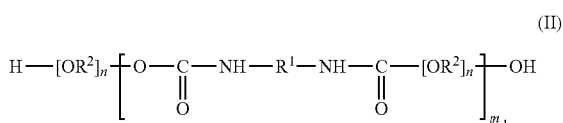

by reacting one mole of diisocyanate of formula (III): NCO—$R^1$—NCO with a stoichiometric excess of a polyether diol of formula (IV): H—$[OR^2]_n$—OH, which corresponds to a number ratio of NCO/OH functions<1 and preferably of about 0.5.

The reaction takes place at a temperature of between 60 and 90° C., for a time of about 2 to 8 hours, optionally in the presence of a catalyst.

At a second step, the polyether-polyurethane polyol of formula (II) is converted to a prepolymer of formula (I) via silylation reaction with an isocyanatosilane of formule (V): NCO—$R^3$—Si$(R^4)_p$(OR$^5$)$_{3-p}$ in a proportion of about one mole of polyether-polyurethane polyol of formula (II) per 2 moles of compound of formula (V).

Polyether diols of formula (IV) are widely available commercially as are isocyanatosilanes of formula (V). For example, mention can be made of gamma-isocyanato-n-propyl-trimethoxysilane available under the trade name GENIOSIL® GF 40, or alpha-isocyanato-n-methyl-methyl-dimethoxysilane available under the trade name GENIOSIL® XL 42, both from Wacker.

These two synthesis steps are conducted under anhydrous conditions, to prevent hydrolysis of the alkoxysilane groups. A typical temperature range for implementing these reactions is from 30 to 120° C., and more particularly from 60 to 90° C. A slight variation from the previously given stoichiometries can be envisaged without any problem provided however that 10% is not exceeded at the first step (synthesis of the polyether-polyurethane polyol of formula (II)) and 2% at the second step (synthesis of the prepolymer of formula (I)).

Reference is made to European patent EP 2235133 for more details concerning the preparation of the prepolymer of formula (I) having terminal groups of alkoxysilane type when $m_1$ is nonzero.

The number average molecular weight (Mn) of the prepolymer of formula (I) is between 600 Da and 60 kDa.

In one preferred variant, the prepolymer of formula (I) is such that its number average molecular weight (Mn) is between 4 and 50 kDa, and the number average molecular weight of the block polyether of formula —[OR$^2$]$_n$— is between 2 and 25 kDa.

In another preferred variant, the prepolymer of formula (I) is such that:

$R^1$ is selected from among one of the following divalent radicals having the formulas given below showing the 2 free valences:

a) the divalent radical derived from isophorone diisocyanate (IPDI):

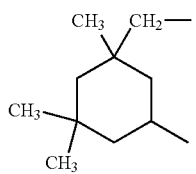

b) the divalent radical derived from 4,4'- and 2,4'-dicyclohexylmethane diisocyanate (HMDI):

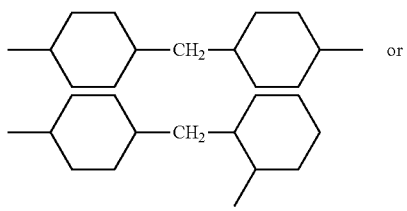

c) the radical derived from 2,4- and 2,6-toluene diisocyanate (TDI):

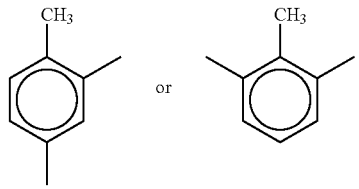

d) the radical derived from 4,4'- and 2,4'-diphenylmethane diisocyanate (MDI):

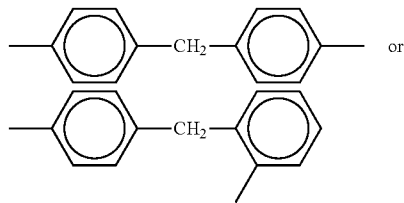

e) the radical derived from m-xylylene diisocyanate (m-XDI):

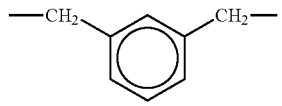

f) the radical derived from hexamethylene diisocyanate (HDI):

$R^2$ is the ethylene and/or isopropylene divalent radical;
$R^3$ is the methylene and/or n-propylene divalent radical;
$R^4$ and $R^5$ are each the methyl or ethyl radical.

In a more particularly preferred variant, the prepolymer of formula (I) is such that:

$R^1$ is the divalent radical derived from isophorone diisocyanate (IPDI) of formula:

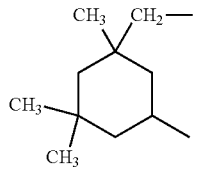

$R^2$ is the isopropylene divalent radical;
$R^3$ is the n-propylene divalent radical;
the —Si$(R^4)_p$(OR$^5$)$_{3-p}$ group is the trimethoxysilyl radical.

If $m_1$ is zero, the prepolymer of formula (I) can be obtained by reacting a polyether diol of formula (IV): H—[OR$^2$]$_n$—OH with an isocyanatosilane of formula (V): NCO—$R^3$—Si$(R^4)_p$(OR$^5$)$_{3-p}$, in a proportion of about one mole of polyether diol of formula (IV) per 2 moles of compound of formula (VII).

This synthesis step is conducted under anhydrous conditions to prevent hydrolysis of the alkoxysilane groups. A typical temperature range for implementing this reaction is from 30 to 120° C., and more particularly from 60 to 90° C. A slight variation from the given stoichiometries can be envisaged without any problem provided however that it does not exceed 2%.

Reference is made to European patent EP 2336208 for more details concerning the preparation of the prepolymer of formula I) having terminal groups of alkoxysilane type when $m_1$ is zero.

In one similarly advantageous variant, the prepolymer of formula (I) has a polymolecularity index of between 1.1 and 2.0. The polymolecularity index is the ratio of the weight average molecular weight to the number average molecular weight. Said prepolymer can be prepared from a polyether diol of formula (IV) itself having a polymolecularity index of between 1 and 1.6. Said polyether can be obtained in manner known per se by polymerization of the corresponding alkylene oxide in the presence of a catalyst containing a double metal cyanide complex.

Said prepolymer can preferably be prepared from a poly (isopropoxy) diol (also called polypropylene glycol or polyoxyisopropylene diol) of which the polymolecularity index can vary from 1 to 1.4. Said polypropylene glycols are commercially available. For example, mention can be made of polypropylene glycols having a polymolecularity index of about 1.1 available under the trade name ACCLAIM® from Bayer, such as ACCLAIM® 8200 having a number average molecular weight of about 8250 Da, ACCLAIM® 12200 having a number average molecular weight of 11225 Da and ACCLAIM® 18200 having a number average molecular weight of 18100 Da.

Silylated polyethers and silylated polyether-polyurethanes of formula (I) are also commercially available.

In one particular embodiment, the silylated polyether and polyether-polyurethane of formula (I), with $m_1$ being zero or nonzero, has a viscosity measured at 23° C. ranging from 25 to 60 Pa·s.

In a more particular embodiment, the silylated polyether of formula (I), with $m_1$ zero or nonzero, has a viscosity measured at 23° C. ranging from 30 to 37 Pa·s.

In one embodiment of the invention, the amount by weight of silylated prepolymer (I) (with $m_1$ zero or nonzero) is preferably 20 to 85% relative to the weight of the adhesive composition. More preferably, it is 30 to 75% and still more advantageously it is 40% to 65%.

In another embodiment, the silylated prepolymer is a polyether-polyurethane of formula (VI):

$R^6$ is a hydrogen atom, phenyl radical, 2-succinate radical, or a linear, branched or cyclic alkyl radical having 1 to 6 carbon atoms;

n is an integer such that the number average molecular weight of the block polyether of formula $—[OR^2]_n—$ is between 300 Da and 30 kDa;

$m_2$ is a nonzero integer;

n and $m_2$ are such that the number average molecular weight of the polymer of formula (I) is between 600 Da and 60 kDa;

p is an integer equal to 0, 1 or 2.

The prepolymer of formula (VI) can be obtained with the following method.

At a first step, a polyether-polyurethane polyol is synthesized comprising two isocyanate terminal groups and of formula (II'):

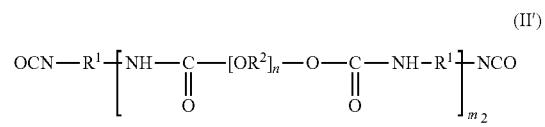

by reacting one mole of polyether diol of formula (IV): H—[OR$^9$]$_n$—OH (IV) with a stoichiometric excess of a diisocyanate of formula (III): NCO—R$^1$—NCO, which corresponds to a number ratio of NCO/OH functions higher than 1. Preferably the NCO content of compound (II') ranges from 1.5 to 1.9%.

At a second step, the polyether-polyurethane polyol of formula (II') is converted to a prepolymer of formula (I) via silylation reaction with an aminosilane of formula (V'): R$^6$—NH—R$^3$—Si(R$^4$)$_p$(OR$^5$)$_{3-p}$ in a proportion of about one mole of polyether-polyurethane diisocyanate of formula (II') per 2 moles of the compound of formula (V').

Polyether diols of formula (IV) are widely available commercially, as are aminosilanes of formula (V'). For example, mention can be made of gamma-amino-n-propyl-trimethoxysilane and alpha-amino-n-methyl-methyldimethoxysilane in the GENIOSIL® range available from Wacker.

This synthesis step is conducted under anhydrous conditions to prevent hydrolysis of the alkoxysilane group. A typical temperature range for implementing this reaction is from 30 to 120° C., and more particularly from 60 to 90° C.

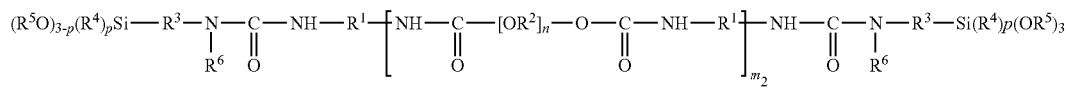

where:
 R$^1$ is a divalent hydrocarbon radical having 5 to 15 carbon atoms and can be aromatic or aliphatic, linear, branched or cyclic;
 R$^2$ is a linear or branched divalent alkylene radical having 1 to 4 carbon atoms;
 R$^3$ is a linear divalent alkylene radical having 1 to 3 carbon atoms;
 R$^4$ and R$^5$, the same or different, are each a linear or branched alkyl radical having 1 to 4 carbon atoms, with the possibility when there are several R$^4$ or R$^5$ radicals that they can be the same or different;

A slight variation from the previously given stoichiometries can be envisaged without any problem provided it does not exceed 2%.

Reference is made to European patent EP 2889348 for more details concerning the preparation of the prepolymer of formula (VI) having terminal groups of alkoxysilane type.

In one similarly advantageous variant, the prepolymer of formula (VI) has a number average molecular weight (Mn) of between 600 Da and 60 kDa and a polymolecularity index of between 1.5 and 2.5. The polymolecularity index is the ratio of the weight average molecular weight (Mw) to the number average molecular weight (Mn).

Said prepolymer can be prepared from a polyether diol of formula (IV) itself having a polymolecularity index of between 1 and 1.6. Said polyether can be obtained in manner known per se by polymerization of the corresponding alkylene oxide in the presence of a catalyst containing a double metal-cyanide complex.

Said prepolymer can be prepared from a poly(isopropoxy) diol (also called polypropylene glycol or polyoxyisopropylene diol) having a polymolecularity index possibly varying from 1 to 1.4. Said polypropylene glycols are commercially available. For example, mention can be made of the polypropylene glycols having a polymolecularity index of about 1.1 available under the trade name ACCLAIM® from Bayer, e.g. ACCLAIM® 8200 having a number average molecular weight of about 8250 Da, ACCLAIM® 12200 having a number average molecular weight of 11225 Da and ACCLAIM® 18200 having a number average molecular weight of 18100 Da.

Silylated polyether-polyurethanes of formula (VI) are also commercially available.

In one advantageous variant, the prepolymer of formula (VI) has one or more of the following characteristics:
$R^4$ and $R^5$, the same or different, are each a methyl or ethyl radical;
$R^3$ is a linear divalent alkylene radical having 1 to 3 carbon atoms;
$R^2$ is selected from among the following divalent radicals: ethylene, isopropylene, n-propylene, n-butylene, ethylethylene;
$R^6$ is a phenyl radical, 2-succinate radical or a linear, branched or cyclic alkyl radical having 1 to 6 carbon atoms.

In one preferred variant, the prepolymer of formula (VI) is such that:
P=0 or 1;
$R^4$ and $R^5$ are each the methyl radical;
$R^3$ is an alkylene radical having 3 carbon atoms;
$R^6$ is a phenyl radical, 2-succinate radical or a linear, branched or cyclic alkyl radical having 1 to 6 carbon atoms.

In another preferred variant, the prepolymer of formula VI) is such that:
$R^1$ is selected from among one of the following divalent radicals having the formulas given below showing the 2 free valences:
  a) the divalent radical derived from isophorone diisocyanate (IPDI):

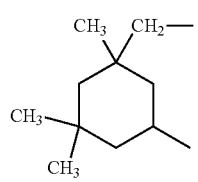

b) the divalent radical derived from 4,4'- and 2,4'-dicyclohexylmethane diisocyanate (HMDI):

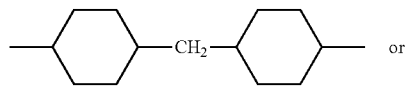

-continued c) the radical derived from 2,4- and 2,6-toluene diisocyanate (TDI):

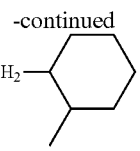

d) the radical derived from 4,4'- and 2,4'-diphenylmethane diisocyanate (MDI):

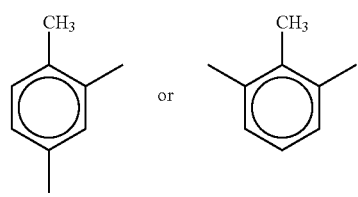

e) the radical derived from m-xylylene diisocyanate (m-XDI):

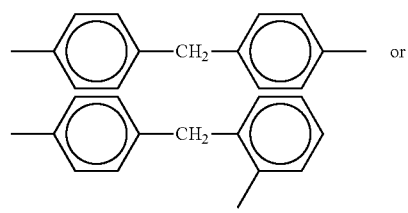

f) the radical derived from hexamethylene diisocyanate (HDI):

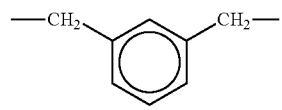

$R^2$ is the ethylene and/or isopropylene divalent radical;
$R^3$ is the methylene and/or n-propylene divalent radical;
$R^4$ and $R^5$ are each the methyl or ethyl radical;
$R^6$ is a phenyl radical, 2-succinate radical or a linear, branched or cyclic alkyl radical having 1 to 6 carbon atoms.

In one more particularly preferred variant, the prepolymer of formula (VI) is such that:
$R^1$ is the divalent radical derived from isophorone diisocyanate (IPDI) of formula:

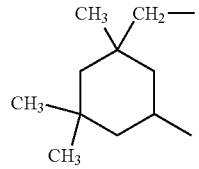

$R^2$ is the divalent isopropylene radical;
$R^3$ is the divalent n-propylene radical;
$R^6$ is a phenyl radical, 2-succinate radical or a linear, branched or cyclic alkyl radical having 1 to 6 carbon atoms;
the $—Si(R^4)_p(OR^5)_{3-p}$ group is the trimethoxysilyl radical.

In one particular embodiment, the polyether-polyurethane of formula (VI) has a viscosity measured at 23° C. ranging from 25 to 100 Pa·s.

In a more particular embodiment, the polyether of formula (VI) has a viscosity measured at 23° C. ranging from 25 to 60 Pa·s.

In one embodiment of the invention the amount by weight of silylated prepolymer is preferably from 20 to 85% relative to the weight of the adhesive composition. More preferably, it is 30 to 75% and more advantageously from 40% to 65%.

Plasticizer

Preferably, the plasticizer comprises a tackifying resin. More preferably the plasticizer is a tackifying resin. In the entire description below, the more preferred variant of the tackifying resin is considered. However, in the entire description it is to be considered that any other plasticizer can be used instead of (or in addition to) the tackifying resin.

For example, the other plasticizers able to be used particularly include:
  phthalate plasticizers such as bis(2-ethylhexyl)phthalate, diisodecyl phthalate, diisononyl phthalate and butyl benzyl phthalate, and more particularly diisodecyl phthalate (e.g. marketed under the trade name PALATINOL™ DIDP by BASF);
  polyol esters, particularly pentaerythritol tetravalerate (e.g. marketed under the trade name PEVALEN™ by PERSTORP);
  dialkylesters of cyclohexane-dicarboxylic acid, the alkyl radicals of ester groups each independently having 1 to 20 carbon atoms, and particularly diisononyl-1,2-cyclohexanedicarboxylate (e.g. marketed under the trade name HEXAMOLL DINCH® by BASF);
  esters of alkylsulfonic acid and phenol (particularly the product marketed under the trade name MESAMOLL® by LANXESS).

In one embodiment, the tackifying resin is compatible with the silylated prepolymer. By compatible tackifying resin it is meant a tackifying resin which, when mixed in 50%:50% proportions with the silylated prepolymer, gives a substantially homogenous mixture.

In one particular embodiment of the invention, the tackifying resin has a number average molecular weight of between 200 Da and 10 kDa.

Particularly advantageous in the meaning of the present invention are the tackifying resins selected from among:
  (i) resins obtained by polymerization of terpene hydrocarbons and phenols, in the presence of Friedel-Crafts catalysts;
  (ii) resins obtained with a method comprising polymerization of alpha-methyl styrene;
  (iii) rosins of natural or modified origin, and the derivatives thereof hydrogenated, dimerized, polymerized or esterified by monoalcohols or polyols;
  (iv) resins obtained by hydrogenation, polymerization or copolymerization of mixtures of unsaturated aliphatic hydrocarbons having about 5, 9 or 10 carbons atoms derived from petroleum fractions;
  (v) terpene resins;
  (vi) copolymers containing natural terpenes; and
  (vii) acrylic resins having viscosity lower than 100 Pa·s at 100° C.

Said resins are commercially available and among those of type (i), (ii) and (iii) defined above, the following products can be cited:
  type (i) resins: Dertophene® 1510 available from DRT having a molecular weight of about 870 Da; Dertophene® H150 available from the same company and having a molecular weight of about 630 Da; Sylvarez® TP 95 available from Arizona Chemical having a molecular weight of about 1200 Da;
  type (ii) resins: Norsolene® W100 available from Cray Valley, obtained by polymerization of alpha-methyl styrene without phenolic action, having a number average molecular weight of 900 Da; Sylvarez® 510 also available from Arizona Chemical having a molecular weight of about 1740 Da, obtained with a method also comprising the addition of phenols.
  type (iii) resins: Sylvalite® RE 100 which is an ester of rosin and pentaerethritol available from Arizona Chemical and having a molecular weight of about 1700 Da.

Most preferably, the tackifying resin is selected from among type (i) resins or type (ii) resins.

In another preferred variant, as tackifying resins a type (iii) resin is used and preferably a rosin ester.

The amount by weight of tackifying resin is preferably 15 to 80% relative to the weight of the adhesive composition. More preferably, it is 25 to 70% and more advantageously it is 35% to 60%.

In one particular embodiment, the resin before degassing has a water content higher than or equal to 500 ppm, preferably higher than or equal to 1000 ppm, more preferably higher than or equal to 2000 ppm, even 4000 ppm. The water content of the resin can be measured by Karl Fisher assay according to standard ISO 760.

Crosslinking Catalyst

The adhesive composition prepared with the method of the invention may or may not comprise a crosslinking catalyst. In the latter case, a crosslinking catalyst may nevertheless be added at a later time to the adhesive composition, for example at the time of use and application thereof.

If the adhesive composition comprises a catalyst, the method of the invention comprises the adding of the catalyst. Preferably the catalyst is added in the extruder. Alternatively, it can be added outside the extruder. For example, the catalyst is added to the adhesive composition after it has been discharged from the extruder e.g. using a dynamic mixer.

If the catalyst is added to the extruder, it can be fed into any point of the extruder. In one advantageous embodiment, the crosslinking catalyst is added to the extruder between the feeding of the silylated prepolymer and discharging from the extruder. Alternatively, the catalyst can be added between the feeding of the tackifying resin into the extruder and degassing of the tackifying resin, or at the same time as the feeding of the tackifying resin.

In one embodiment, the catalyst is added alone. In another embodiment, the catalyst is mixed with a carrier such as polypropylene glycol for example. In another embodiment, the catalyst is added mixed with one or more other components of the composition such as the tackifying resin or silylated prepolymer.

If contained in the adhesive composition, the crosslinking catalyst can be any catalyst known to skilled persons for the condensing of silanols. For example, said catalysts are organic derivatives of tin such as dibutyltin dilaurate (or DBTL) or dioctyltin dineodecanoate (commercially available under the trade name TIBKAT® 223). As examples of said catalysts, mention can also be made of organic derivatives of titanium such as titanium acetyl acetonate (commercially available under the trade name TYZOR® AA75 from DuPont), of aluminium such as aluminium chelate (commercially available under the trade name K-KAT® 5218 from King Industries), and of amines such as 1,8-diazobicyclo (5.4.0) undecene-7 or DBU.

In one particular embodiment, the amount by weight of crosslinking catalyst is 0.01% to 8% relative to the weight of the adhesive composition. Preferably, the amount by weight of catalyst is 0.1% to 2%.

Other Additives

Optionally, the method of the invention may also comprise the addition of thermoplastic polymers often used to prepare HMPSAs, such as ethylene vinyl acetate (EVA) of block styrene copolymers. These thermoplastic polymers can be added in combination with the silylated prepolymer or else fed into the extruder separately from the silylated prepolymer.

The method of the invention can advantageously comprise the addition of one or more antioxidants (or stabilizers). Advantageously, the amount by weight of antioxidant is 0.1 to 2%. These compounds are added to protect the adhesive composition against degradation resulting from reaction with oxygen which is likely to occur under the action of heat or light. These compounds can include primary antioxidants which trap free radicals and in particular are substituted phenols such as Irganox® 1076 by CIBA. Primary antioxidants can be used alone or in combination with other secondary antioxidants or UV stabilizers. In one preferred variant of the invention, the antioxidant is added to the extruder at the same time as the tackifying resin.

The method of the invention may further comprise the adding of one or more moisture scavengers, preferably a hydrolysable alkoxysilane derivative and further preferably a derivative of trimethoxysilane. Advantageously, the amount by weight of moisture scavenger is less than or equal to 3%. Said moisture scavenger advantageously extends the shelf life of the adhesive composition during storage and transport before use. For example, gamma-methacryloxy-propyltrimethoxysilane can be cited, available under the trade name SILQUEST® A-174 from US Momentive Performance Materials Inc.

The method of the invention can also comprise the addition of a plasticizer such as a phthalate or benzoate, paraffinic or naphthenic oil (e.g. Primol® 352 by ESSO) or a wax of a polyethylene homopolymer (e.g. A-C® 617 by Honeywell), or a wax of a polyethylene and vinyl acetate copolymer, or pigments, colouring agents or fillers.

The above additives can be fed into the extruder at different points or at the same point. They can be added at the same point as the plasticizer, at the same point as the silylated prepolymer, or at one or more points differing from the feed points of the plasticizer and silylated prepolymer.

Extrusion Method

The method of the invention is implemented using an extruder comprising at least two rotating screws.

In one advantageous embodiment, the extruder is a twin-screw extruder.

In one preferred embodiment, the extruder is a co-rotating, intermeshing twin-screw extruder. In this embodiment, the two screws of the extruder rotate in the same direction and touch each other. Alternatively, the extruder can be a counter-rotating twin-screw extruder, the two screws of the extruder rotating in opposite direction.

The extruder used in the method of the invention can also be a tri-screw extruder or any other multi-screw extruder.

In one preferred embodiment, the geometry of the extruder is defined by the ratio of the outer diameter of the screws to the inner diameter of the screws (De/Di), being 1.3 to 1.8, preferably 1.55 to 1.8.

In one particularly advantageous embodiment, the length of the extruder is defined by a multiple of the diameter of the screws (D), being 28D to 100D, preferably 40D to 80D.

The rotating speed of the screws can be 150 rpm to 1200 rpm, preferably 300 rpm to 600 rpm.

The method of the invention successively comprises:
feeding a tackifying resin into the extruder;
degassing the tackifying resin in the extruder;
feeding a silylated prepolymer and mixing the latter with the tackifying resin in the extruder;
discharging the mixture from the extruder.

The feeding of the compounds into the extruder can be obtained by means of hoppers arranged at desired points along the extruder. These hoppers can be equipped with metering feeders providing control over the quantities of compounds fed into the extruder.

In one embodiment of the method of the invention, the residence time of the tackifying resin in the extruder is 0.1 to 3 minutes. Said residence time is of particular advantage since the compounds of the adhesive composition, and in particular the tackifying resin and silylated prepolymer are held at high temperatures for very little time when being processed, thereby reducing the risk of degradation of these compounds. More advantageously, this residence time is 0.5 to 2.5 min and further advantageously 1 to 2 min.

By degassing it is meant the operation whereby the quantity of any gas contained in a compound or mixture of compounds is reduced, for example in the tackifying resin. In particular, degassing allows the removal of all or part of the water contained in the tackifying resin. It can also allow the removal of all or some VOCs contained in the resin, in particular VOCs formed by degradation of the tackifying resin during processing.

Degassing can be obtained by applying a vacuum (or pressure drop). This vacuum is obtained by applying depressurization lower than or equal to 760 mmHg compared with atmospheric pressure e.g. of between 350 and 760 mmHg, preferably between 400 and 700 mmHg, and further preferably between 600 and 700 mmHg.

In one embodiment, the tackifying resin after being degassed contains an amount of water less than or equal to 500 ppm, preferably less than or equal to 300 ppm, more preferably less than or equal to 200 ppm, further preferably less than or equal to 100 ppm. The water content of the resin can be measured by Karl Fisher assay according to standard ISO 760.

Advantageously, the temperature of the extruder during degassing is from 5° C. to 100° C. above the softening temperature of the tackifying resin. The ring-and-ball softening temperature of the tackifying resin is measured according to standard ISO 4625. The application of said temperature allows the resin to be held at sufficiently high temperature so that it is sufficiently fluid to allow efficient degassing.

The method of the invention may comprise one or more additional degassing operations in addition to degassing of the tackifying resin. In particularly advantageous manner, the method comprises at least one additional degassing after mixing the silylated prepolymer with the tackifying resin. The presence of at least one additional degassing after mixing the silylated prepolymer with the tackifying resin can allow a final adhesive composition to be obtained with low bubble content. These degassing operations can be conducted by lowering pressure, in particular with depressurization lower than or equal to 760 mmHg relative to atmospheric pressure e.g. between 350 mmHg and 760 mmHg, preferably between 400 mmHg and 700 mmHg.

In one embodiment, the temperature of the extruder varies from upstream to downstream i.e. from the feed point of the tackifying resin as far as the discharge point along the extruder.

In one advantageous embodiment, the temperature of the extruder from upstream to downstream increases from ambient temperature up to a maximum temperature Tmax when degassing the tackifying resin, and then decreases down to a final temperature Tf when the mixture is discharged. The variation in temperature from ambient temperature up to Tmax, and from Tmax down to Tf, can be monotonous. Alternatively, local temperature decreases and respectively local temperature increases can be observed.

In one more particular embodiment, Tmax is between 150° C. and 220° C., preferably between 160° C. and 180° C., more preferably between 165° C. and 175° C. In one preferred embodiment, Tmax is about 170° C. The application of said temperature generally allows good fluidity to be obtained at the time of degassing, thereby improving efficiency whilst avoiding an excessive temperature likely to degrade the resin.

In one embodiment, Tf is between ambient temperature and Tmax. In a more particular embodiment, Tf is between 80° C. and 145° C. and preferably between 120° C. and 140° C. In one preferred embodiment, Tf is about 130° C.

In one embodiment, the temperature of the extruder when mixing the silylated prepolymer with the tackifying resin, Tm, is between Tf and Tmax. In a more particular embodiment, Tm is between 130° C. and 170° C., preferably between 140° C. and 160° C., more preferably between 145° C. and 155° C. In one preferred embodiment, Tm is about 150° C.

In one advantageous embodiment, the temperature of the extruder from upstream to downstream:
  increases from ambient temperature up to a temperature T1 of between 100° C. and 180° C., preferably between 120° C. and 130° C., more preferably of about 125° C.,
  then increases up to a temperature Tmax when degassing the tackifying resin, of between 150° C. and 220° C., preferably between 160° C. and 180° C., more preferably between 165° C. and 175° C., and further preferably of about 170° C.,
  decreases down to a temperature T2 of between 130° C. and 155° C., preferably between 140° C. and 150° C., more preferably of about 145° C.,
  increases up to a temperature Tm when mixing the silylated prepolymer with the tackifying resin, of between 130° C. and 170° C., preferably between 140° C. and 160° C., more preferably between 145° C. and 155° C., further preferably of about 150° C.,
  drops down to a temperature Tf when discharging the mixture, of between 20° C. and 145° C., preferably between 120° C. and 140° C., more preferably of about 130° C.

Different screw parts can be assembled onto the extruder shaft to impart a particular profile. For example, specific elements known to skilled persons can be added to create dynamic plugging or mixing zones, optionally supported by the application of an adapted temperature. The extruder may also comprise conveying screw elements allowing conveying of the compounds in the direction of the discharge point.

In one embodiment, the extruder comprises an alternation of one or more conveying elements and one or more specific elements creating dynamic plugging or mixing zones. The creation of two dynamic plugs surrounding a conveying zone can set up a substantially sealed zone between said two plugs. This substantially sealed zone facilitates the application of a vacuum for degassing.

In one particular embodiment, the extruder from the feed point of the tackifying resin as far as the discharge point, comprises a conveying zone, a melt zone (preferably at above-mentioned temperature T1), a conveying zone (preferably at above-mentioned temperature Tmax) in which degassing of the tackifying resin takes place, a dynamic plug (preferably at above-mentioned temperature T2), a conveying zone into which the silylated prepolymer is fed, a mixing zone with dynamic plugging (preferably at above-mentioned temperature Tm) where the prepolymer is mixed with the tackifying resin, a conveying zone (optionally at above-mentioned temperature Tf) in which further degassing is optionally carried out, and a final plugging zone (optionally also at above-mentioned temperature Tf), which can be generated by the mere presence of a die at the end of the extruder.

In one embodiment, the discharging of the mixture from the extruder is performed through a nozzle. In one embodiment, the nozzle allows coating of a substrate with the adhesive composition. Coating can take place in any possible form e.g. in film, spray, bead or cluster form. The substrate on which the composition is coated can be a non-stick substrate. It can be a substrate carrying the adhesive composition e.g. for later crosslinking.

EXAMPLES

The following are nonlimiting examples of the invention.

Example 1: Analysis of the VOC Content in the Tackifying Resin

Extrusion tests were conducted on a ZSK26MC meshing twin-screw, co-rotating extruder by Coperion. The screw diameter was 26 mm, De/Di geometry was 1.55 and the length of the extruder was 40D. The extruder was composed of 10 successive barrels each of 4D and denoted F1 to F10. The rotating speed of the screws was 300 rpm and the overall flow rate was 15 kg/h. The temperature of the twin-screw extruder was adjusted to maintain T1 at 125° C., Tmax at 170° C., T2 at 145° C., Tm at 150° C. and Tf at 130° C.

The tackifying resin (Dertophene H150 resin) was fed into the start of the twin-screw extruder with an antioxidant (Irganox 245) in a weight proportion of 1% relative to the tackifying resin.

The resin was degassed in the extruder by applying depressurization of 700 mmHg to barrel F4. The VOC content of the resin after discharge from the extruder was measured.

The VOC content was also measured on untreated Dertophene H150 resin which was used as reference.

The measured VOCs were the following:

| | |
|---|---|
| A | toluene |
| B | camphene |
| C | phenol |
| D | trans-3-caren-2-ol |
| E | 1,7,7-trimethylbicyclo[2.2.1]hept-2-yl 3-methylenecyclopentanecarboxylate |
| F | (1,7,7-trimethylbicyclo[2.2.1]hept-2-yl)phosphonous dichloride |
| G | 2-butanone |
| H | tricyclene |
| I | ethyl acetate |

The VOC content was measured by gas phase chromatography coupled with mass spectrometry (GC-MS) at 120° C., for 30 min.

The results are given in FIG. 1. It can be seen that by degassing the tackifying resin in the molten state under reduced pressure, the initial amount of VOC is significantly reduced in number and in mass. After degassing, there mostly remain 5 identifiable volatile compounds out of 9 initially. The final content thereof is also reduced.

Example 2: Analysis of the Water Content in the Tackifying Resin

Dertophene H150 tackifying resin was fed alone into a twin-screw extruder such as described for Example 1. The depressurization applied for degassing the resin was 700 mmHg. Residual water of the resin was measured after discharge from the extruder.

Residual water measurements were also conducted on the untreated Dertophene H150 resin (reference) and on Dertophene H150 resin degassed with a batch method (degassing in a tank at 160° C. for 1 hour) (comparative test).

The results are given below.

| | Untreated resin | Resin degassed with batch method | Resin degassed with twin-screw extruder |
|---|---|---|---|
| Residual water content (ppm) | 4575 | 525 | 275 |

The continuous method using a twin-screw extruder allows more efficient removal of the residual water contained in the resin than the batch method, and under less harsh conditions (lower temperature measured at 131° C. on discharge from the extruder, and shorter residence time).

Example 3: Analysis of VOC Content in the Adhesive Composition

A PSA composition was prepared following the protocol described in Example 1, with the exception that a silylated prepolymer was fed into the extruder at barrel F6, after degassing the resin. The resin and prepolymer were mixed in the extruder and the PSA composition obtained was analysed after discharge from the extruder: the VOC content of the composition was measured by GC-MS at 120° C., for 30 min.

Measurements of VOC quantities were also made on an identical industrial PSA composition prepared with a batch method (comparative test).

Figure 2:
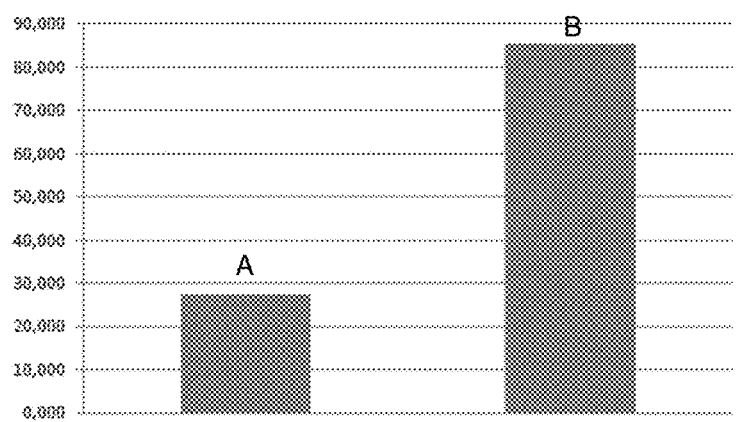
FIG. 2 illustrates the VOC content of a PSA composition obtained with the method of the invention described in Example 3 (A) and that of an industrial PSA prepared using a batch method (B), measured by gas phase chromatography coupled with mass spectrometry. The Y-axis represents the total VOC content divided by 10 (in ppm).

The results are given in FIG. 2. The amount of VOCs contained in the composition obtained with the method of the invention is much lower than that contained in a composition prepared with a batch method.

Example 4: Analysis of the Adhesive Composition by Size Exclusion Chromatography The adhesive composition prepared with the method of the invention and the industrial composition prepared with a batch method as described in Example 3 were analysed by size exclusion chromatography.

It can be seen that the two curves are practically superimposed indicating that the 2 compositions are very close. Therefore, the preparation method using an extruder does not have any impact on the adhesive composition: it is of similar quality to that of the industrial composition.

The invention claimed is:

1. A method comprising preparing an adhesive composition, using an extruder having at least two rotating screws, by successively:
   feeding at least one plasticizer into the extruder;
   degassing the at least one plasticizer in the extruder, wherein the at least one plasticizer, after being degassed, contains an amount of water by weight lower than that present in the at least one plasticizer before degassing;
   feeding at least one silylated prepolymer and mixing the latter with the at least one plasticizer in the extruder; and
   discharging the mixture from the extruder,
   wherein the temperature of the extruder when degassing the at least one plasticizer is 5° C. to 100° C. above the ring-and-ball softening temperature of the at least one plasticizer measured according to standard ISO 4625.

2. The method according to claim 1, wherein the extruder is a co-rotating, intermeshing twin-screw extruder.

3. The method according to claim 1, wherein the extruder has screws having an outer diameter and an inner diameter with a geometry defined by the ratio of the outer diameter of the screws to the inner diameter of the screws, De/Di, being 1.3 to 1.8.

4. The method according to claim 1, wherein the screws have a diameter D and the length of the extruder is defined by a multiple of the diameter D of the screws, being 28D to 100D.

5. The method according to claim 1, wherein the at least one silylated prepolymer has a main chain that is a main polyether chain, main polyether-polyurethane chain, main polyester chain, main polyester-polyurethane chain, main polyether-polyester-polyurethane chain, main polyolefin chain, main polyolefin-polyurethane chain, main polyether-polyolefin-polyurethane chain, main polyacrylate chain or main polyether-polyacrylate chain, and comprises two hydrolysable alkoxysilane terminal groups.

6. The method according to claim 1, wherein the at least one silylated prepolymer is a prepolymer of formula (I):

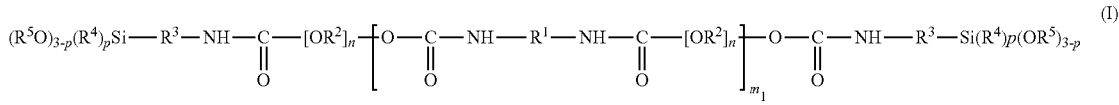

wherein:
R¹ is a divalent hydrocarbon radical having 5 to 15 carbon atoms and can be aromatic or aliphatic, linear, branched or cyclic;
R² is a linear or branched, divalent alkylene radical having 1 to 4 carbon atoms;
R³ is a linear, divalent alkylene radical having 1 to 3 carbon atoms;
R⁴ and R⁵, the same or different, are each a linear or branched alkyl radical having 1 to 20 carbon atoms, with the possibility when there are several R⁴ or R⁵ radicals that they can be the same or different;
n is an integer such that the number average molecular weight of the block polyether of formula—[OR²]$_n$— is between 300 Da and 30 kDa;
m₁ is a zero or nonzero integer;
n and m1 are such that the number average molecular weight of the polymer of formula (1) is between 600 Da and 60 kDa;
p is an integer equal to 0, 1 or 2.

7. The method according to claim 1, wherein the at least one silylated prepolymer is a polyether of formula (VI):

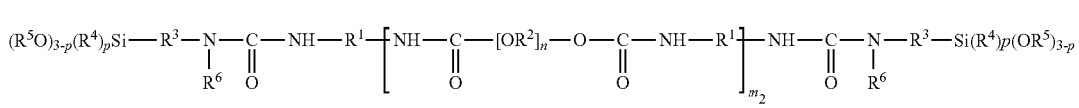

wherein:
R¹ is a divalent hydrocarbon radical having 5 to 15 carbon atoms and can be aromatic, aliphatic, linear, branched or cyclic;
R² is a linear or branched, divalent alkylene radical having 1 to 4 carbon atoms;
R³ is a linear divalent alkylene radical having 1 to 3 carbon atoms;
R⁴ and R⁵, the same or different, are each a linear or branched alkyl radical having 1 to 4 carbon atoms, with the possibility when there are several R⁴ or R⁵ radicals that they can be the same or different;
R⁶ is a hydrogen atom, phenyl radical, 2-succinate radical or a linear, branched or cyclic alkyl radical having 1 to 6 carbon atoms;
n is an integer such that the number average molecular weight of the block polyether of formula—[OR²]$_n$— is between 300 Da and 30 kDa;
m₂ is a nonzero integer;
n and m₂ are such that the number average molecular weight of the polymer of formula (VI) is between 600 Da and 60 kDa;
p is an integer equal to 0, 1 or 2.

8. The method according to claim 1, wherein the at least one plasticizer is or comprises a tackifying resin.

9. The method according to claim 8, wherein the tackifying resin has a number average molecular weight of between 200 Da and 10 kDa and is:

(i) resins obtained by polymerization of terpene hydrocarbons and phenols, in the presence of Friedel-Crafts catalysts;
(ii) resins obtained with a method comprising polymerization of alpha-methyl styrene;
(iii) rosins of natural or modified origin, and the derivatives thereof hydrogenated, dimerized, polymerized or esterified by monoalcohols or polyols;
(iv) resins obtained by hydrogenation, polymerization or copolymerization of mixtures of unsaturated aliphatic hydrocarbons having about 5, 9 or 10 carbon atoms derived from petroleum fractions;
(v) terpene resins;
(vi) copolymers containing natural terpenes; or
(vii) acrylic resins having viscosity at 100° C. lower than 100 Pa·s.

10. The method according to claim 1, wherein the amount by weight of silylated prepolymer is 20 to 85% and the amount by weight of plasticizer is 15% to 80%, relative to the weight of the adhesive composition.

11. The method according to claim 1, wherein the adhesive composition is free of crosslinking catalyst.

12. The method according to claim 1, wherein the adhesive composition comprises a crosslinking catalyst, the method comprising the adding of the catalyst and mixing thereof with the at least one plasticizer and the at least one silylated prepolymer.

13. The method according to claim 12, wherein the amount by weight of crosslinking catalyst is 0.01% to 8%, relative to the weight of the adhesive composition.

14. The method according to claim 1, wherein the residence time of the at least one plasticizer in the extruder is 0.1 to 3 minutes.

15. The method according to claim 1, wherein the at least one plasticizer, after being degassed, contains an amount of water by weight less than or equal to 500 ppm and/or the at least one plasticizer, before degassing, contains an amount of water by weight higher than or equal to 500 ppm.

16. The method according to claim 1 also comprising one or more additions to the extruder of one or more antioxidants, moisture scavengers, thermoplastic polymers, plasticizers, paraffinic or naphthenic oils, waxes of a polyethylene homopolymer, waxes of a polyethylene and vinyl acetate copolymer, pigments, coloring agents or fillers.

17. The method according to claim 1, also comprising one or more additional degassing operations.

18. The method according to claim 1, wherein the temperature of the extruder, from the feed point of the at least one plasticizer as far as the discharge point, increases from ambient temperature up to a maximum temperature Tmax when degassing the at least one plasticizer, Tmax being between 150° C. and 220° C. and then decreases down to a final temperature Tf when discharging of between ambient temperature and Tmax.

19. The method according to claim 18, wherein the temperature of the extruder when mixing the at least one silylated prepolymer with the at least one plasticizer, Tm, is between Tf and Tmax.

20. A method comprising preparing an adhesive composition, using an extruder having at least two rotating screws, by successively:
- feeding at least one plasticizer into the extruder;
- degassing the at least one plasticizer in the extruder, wherein the at least one plasticizer, after being degassed, contains an amount of water by weight lower than that present in the at least one plasticizer before degassing, and wherein the at least one plasticizer, before degassing, contains an amount of water by weight higher than or equal to 500 ppm;
- feeding at least one silylated prepolymer and mixing the latter with the at least one plasticizer in the extruder; and
- discharging the mixture from the extruder, wherein the temperature of the extruder when degassing the at least one plasticizer is 5° C. to 100° C. above the ring-and-ball softening temperature of the at least one plasticizer measured according to standard ISO 4625.

* * * * *